United States Patent [19]

Klein et al.

[11] Patent Number: 4,996,948
[45] Date of Patent: Mar. 5, 1991

[54] ANIMAL COLLAR

[76] Inventors: Valerie L. Klein; Paul P. Klein, both of 320 Spencer La. Ext., Glenshaw, Pa. 15116

[21] Appl. No.: 431,082

[22] Filed: Nov. 3, 1989

[51] Int. Cl.⁵ .............................................. A01K 27/00
[52] U.S. Cl. .................................... 119/106; D30/152
[58] Field of Search .............. 119/106, 109, 96; 63/2, 63/3, 4; D11/3, 6, 9, 10, 13; D30/151, 152, 153

[56] References Cited

U.S. PATENT DOCUMENTS

| | | | |
|---|---|---|---|
| D. 150,538 | 8/1948 | Bauer | D11/9 |
| D. 151,530 | 10/1948 | Philippe | D11/9 |
| D. 161,186 | 12/1950 | Katz | D11/9 |
| D. 289,454 | 4/1987 | Taub | D30/152 |
| 2,743,702 | 5/1956 | Sullivan | 119/106 |
| 3,006,322 | 10/1961 | Vitol et al. | 119/106 |
| 3,011,478 | 5/1961 | Kirby | 119/106 |
| 3,074,378 | 1/1963 | Clayton | 119/106 |
| 3,605,701 | 9/1971 | Sprenger | 119/106 |
| 3,701,339 | 10/1972 | Kemmerling | 119/106 |
| 4,811,695 | 3/1989 | Higgins | 119/106 |
| 4,841,915 | 6/1989 | Rocchetti | 119/106 |

FOREIGN PATENT DOCUMENTS 0039658  10/1931  France .................................. 119/106

*Primary Examiner*—Robert P. Swiatek
*Assistant Examiner*—Todd E. Manahan
*Attorney, Agent, or Firm*—Buchanan Ingersoll; Gordon R. Harris

[57] ABSTRACT

An animal slip collar made of flexible material such as chain links has a ring at one end through which the material is passed to form a loop. An intermediate section of the collar is made of material heavier than the end sections but dimensioned to pass through the ring. When the loop is passed around the animal's neck the extra weight of the intermediate material causes the loop to adjust itself so that the intermediate section is at its low point and the ring is opposite on the back of the animal's neck.

8 Claims, 1 Drawing Sheet

ANIMAL COLLAR

FIELD OF THE INVENTION

This invention relates to a collar for dogs and other animals and is more particularly concerned with a slip type collar constructed so that the end of the collar attached to the live ring is automatically maintained on the back of the animal's neck when the collar hangs loose.

BACKGROUND OF THE ART

Slip type collars are quite generally used for training dogs. Those collars are frequently made from chain links with a ring at each end of the chain. A loop is formed through one of the rings, which may be called the dead ring, and slipped over the animal's neck; the other end ring, which may be called the live ring, may be connected to a leash, or the other end of the chain, if long enough, may be used as such a control. If the dog or other animal pulls against the loop, it tightens around the animal's neck and so restrains it. One of the drawbacks of conventional slip collars is that, if tension in the chain is released, the collar will slide around the animal's neck so that one or both rings are beneath its neck. The control end, if inadvertently released, then falls below the animal's neck so that regaining control of the animal may be difficult.

SUMMARY OF THE INVENTION

We have invented a slip collar which assumes and holds its position on the animal's neck so that the rings are always at the back of the animal's neck where they are most accessible. Our collar may be made of chain links or other materials in the conventional way with at least one end terminating in a ring, which is the dead ring. Preferably the other end also terminates in a ring, called the live ring. A section of the collar intermediate its end portions is made of material which has heavier unit weight than the remainder of the collar but which is dimensioned so that it will pass through the dead ring. When our collar is formed into a loop through the dead ring and the collar is placed around the animal's neck, untensioned, the extra weight of the intermediate section causes the loop to adjust itself so that the intermediate section is at its low point and the live ring is more or less opposite to it. The spacing of the intermediate section with respect to the dead ring is chosen to obtain that result. When the collar is removed from the animal's neck and is held up by the control end, the dead ring slides down the collar and off, doing away with the loop. Our invention also includes a grip attached to the live ring, dimensioned so that it will not pass through the dead ring and may be easily grasped.

BEST MODE

Figure 1:
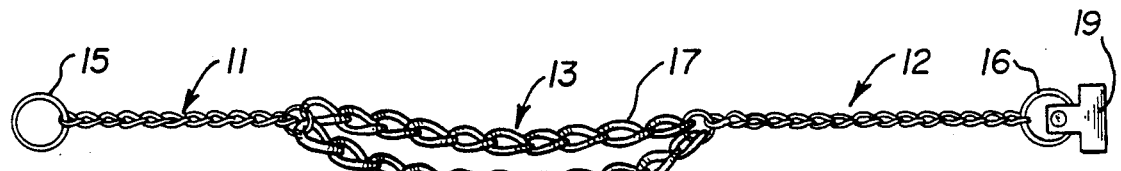
FIG. 1 is an isometric view of our collar in its extended position.

While our collar may be made of any suitable material, it is preferably formed from chain links. Our collar, shown in FIG. 1, has a first end portion 11, an opposite second end portion 12 and an intermediate portion 13. End portion 11 terminates in a ring 15 and end portion 12 in a ring 16, which rings may be of the same size. The end portions preferably comprise the same type and size links, but are preferably of unequal lengths as will explained hereinafter. The intermediate portion 13 preferably comprises two parallel link sections 17 and 18 of about equal length. Sections 17 and 18 may be assembled from identical links or section 18, for example, may be made from heavier links than those of section 17. The aggregate weight of portion 13, however, must be greater than the aggregate weight of portions 11 and 12 and the dimensions of the links making up portion 13 must be such that portion 13 will pass through ring 15. A T-shape grip or other form of grip 19 may be attached to ring 16.

Figure 3:
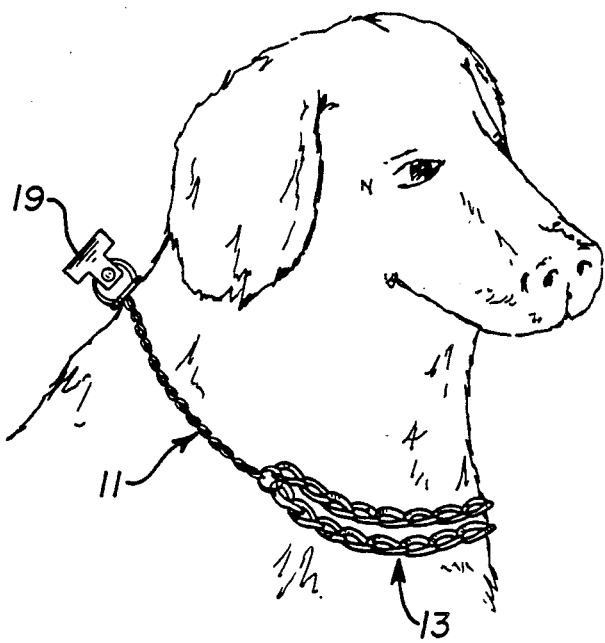
FIG. 3 is an isometric view of our collar in position on an animal's neck.
Figure 2:
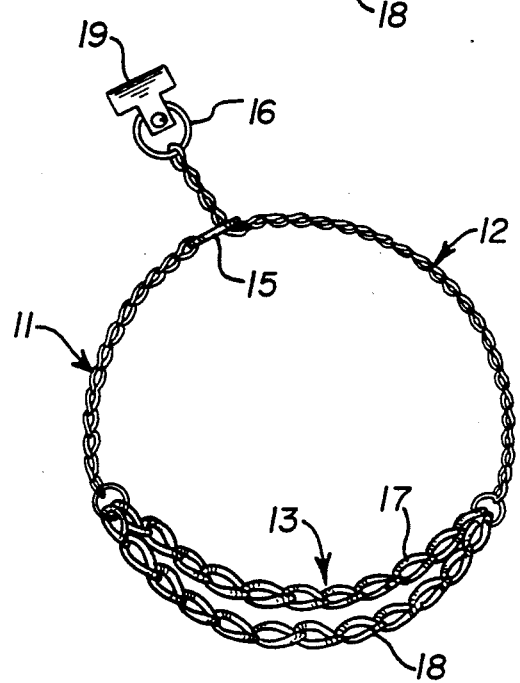
FIG. 2 is an isometric view of our collar formed into the loop which passes around the animal's neck.

Our collar is formed into a slip collar by doubling portion 11 back through ring 15 so as to form a loop, as is shown in FIG. 2. That loop can be slipped over the animal's head, as shown in FIG. 3, or the loop can be formed with the collar on the animal's neck if end 12 has no ring, or a ring 16 that will pass through ring 15. In either way, intermediate portion 13 will drop below the animal's neck on its breast, as shown in FIG. 3, because of its greater weight, and that tendency will be increased by movements of the animal so that, when our collar is untensioned, the rings will be located on the back of the animal's neck where ring 16 can be readily grasped by the owner. Preferably portion 11 of our collar is made somewhat shorter than portion 12 so that at least several links of portion 12 will extend through ring 15 when tension is applied to ring 16 or grip 19. Thus our collar is adapted to animals of different sizes.

Our collar can be removed from the animal by allowing slack and slipping the loop off over the animal's head. When it has been removed, if it is allowed to hang free from ring 16 or grip 19, ring 15 will be pulled down by gravity over portions 12, 13 and 11 until the collar assumes the linear form shown in FIG. 1.

We claim:

1. In a slip type collar of flexible material having a dead ring at one end and means at the other end for exerting tension thereon,
the improvement comprising,
an intermediate section of flexible material of substantially greater weight than the remainder of the collar material and of a thickness that passes through said dead ring.

2. The collar of claim 1 in which said intermediate section is nearer said dead ring end of the collar than the other end.

3. The collar of claim 2 in which said means for exerting tension include a grip dimensioned so that it will not pass through said dead ring.

4. The collar of claim 1 in which said flexible material comprises chain links.

5. The collar of claim 1 in which said intermediate section comprises at least two parallel strands of chain links.

6. The collar of claim 5 in which one of said at least two parallel strands is of heavier links than the other of said at least two strands.

7. The collar of claim 1 in which the weight of said intermediate section is sufficient to cause the collar, when positioned around the animal's neck to hang freely, to hang with said intermediate section below the animal's neck.

8. The collar of claim 7 in which said dead ring end of the collar is dimensioned to cause said ring to lie on the back of the animal's neck when said intermediate section hangs below the animal's neck.

* * * * *